(12) United States Patent
Trottier et al.

(10) Patent No.: US 8,306,399 B1
(45) Date of Patent: Nov. 6, 2012

(54) REAL-TIME VIDEO EDITING ARCHITECTURE

(75) Inventors: Lorne Trottier, Beaconsfield (CA); Michel St-Pierre, Laval (CA); Andre Laframboise, Notre Dame de L'Ile Perrot (CA); Jean LaPierre, Pierrefonds (CA)

(73) Assignee: Matrox Electronic Systems, Ltd. (CA)

( * ) Notice: Subject to any disclaimer, the term of this patent is extended or adjusted under 35 U.S.C. 154(b) by 412 days.

(21) Appl. No.: 12/792,450

(22) Filed: Jun. 2, 2010

Related U.S. Application Data

(63) Continuation of application No. 09/653,701, filed on Sep. 1, 2000, now Pat. No. 7,756,391.

(51) Int. Cl.
*H04N 5/93* (2006.01)
(52) U.S. Cl. .................................................. 386/280
(58) Field of Classification Search .................. 386/280
See application file for complete search history.

(56) References Cited

U.S. PATENT DOCUMENTS

| | | | |
|---|---|---|---|
| 5,159,665 A | 10/1992 | Priem et al. | |
| 5,745,126 A | 4/1998 | Jain et al. | |
| 5,956,046 A | 9/1999 | Kehlet et al. | |
| 6,404,978 B1* | 6/2002 | Abe | 386/281 |
| 6,518,971 B1 | 2/2003 | Pesto, Jr. et al. | |
| 6,542,692 B1* | 4/2003 | Houskeeper | 386/280 |
| 6,636,221 B1* | 10/2003 | Morein | 345/505 |
| 6,678,002 B2* | 1/2004 | Frink et al. | 348/445 |
| 6,763,175 B1 | 7/2004 | Trottier et al. | |
| 6,763,176 B1 | 7/2004 | Trottier et al. | |
| 7,110,006 B2 | 9/2006 | MacInnis et al. | |
| 2007/0217518 A1* | 9/2007 | Valmiki et al. | 375/240.24 |

OTHER PUBLICATIONS

DVR Technology description brochure, 2 pages, 1993.
Targa 2000 EISA brochure, 2 pages, 1994.
True Vista Pro EISA brochure, 2 pages, 1994.
Brochure of RT 2000 used at SIGGRAPH 2000, 8 pages, Jul. 23, 2000.
Sharky Extreme, Matrox Marvel G200, at http://www.sharkyextreme.com/hardwarelmatrox_marvel, at least as early as Apr. 28, 1999.

* cited by examiner

*Primary Examiner* — Jamie Atala
(74) *Attorney, Agent, or Firm* — Rhodes Donahoe, P.C.

(57) ABSTRACT

An architecture which allows real-time video editing using a 2D/3D graphics engine. This architecture comprises input and output buffers. It receives video streams from either compressed sources of data or non compressed sources of data. This architecture allows a flexible upgrade of the video effects using software plug ins.

8 Claims, 4 Drawing Sheets

REAL-TIME VIDEO EDITING ARCHITECTURE

RELATED APPLICATIONS

This application is a continuation of and claims the benefit under 35 U.S.C. §120 to U.S. application Ser. No. 09/653,701, filed on Sep. 1, 2000 entitled "Real-Time Video Editing Architecture", which is hereby incorporated herein by reference in its entirety for all purposes.

FIELD OF THE INVENTION

This invention relates to video editing. More precisely, this invention describes an architecture that allows real-time video editing.

BACKGROUND OF THE INVENTION

Video editing has always been an important issue in video production. Film editing was initially done using splicing tools and title blending equipment. However, in recent few decades, new techniques appeared. One cornerstone in the evolution of these techniques was the beginning of the digital era. This new era opened new horizons and expanded dramatically the type of editing operations that could be performed on video streams. For instance, with this new era, it became possible to use the processing power of the computer.

Today video editing can be performed in a computer using two types of architecture.

The first type of architecture involves a dedicated 3D video special effects chip or chip set whose task is to perform only video editing operations and hardware implemented video effects. While this architecture allows real-time processing, which is a need for live broadcasting, this architecture suffers from a lack of upgradebility. Furthermore, this architecture is usually very expensive and thus not affordable for low end users.

This second type of architecture involves the common graphics chip used in computer graphics cards. This architecture allows video editing operations and video effects. Furthermore, this architecture allows a software upgrade of the video effects. However, this architecture cannot handle, in its present configuration, real-time operations. This is a major drawback that is not acceptable for a professional user and is also a great inconvenience for personal users.

There is thus a need for an architecture that would allow real-time video editing without using expensive dedicated hardware. There is also a need for an architecture that would allow a software upgrade of the video effects that can be performed in real time.

SUMMARY OF THE INVENTION

It is an object of the invention to provide a video editing architecture allowing video editing using various sources of video streams, It is another object of the present invention to provide a video editing architecture that would make use of the graphics processor in a computer, Yet another object of the present invention is to provide a video editing architecture that would allow real-time video editing using the graphics chip located in the computer.

According to a broad aspect of the present invention, there is provided a video editing apparatus for performing video editing in realtime of at least two video streams derived from a codec able to retrieve two video sources from a data storage device and output two uncompressed video data streams. The apparatus comprises:

a video data storage device;
a graphics processor having at least two video inputs and a video output;
a video decoder having a video signal input and an uncompressed digital video output;
a video encoder having an uncompressed video data stream input and a display signal output;
a first video bus transferring data between the video output of the graphics processor and the video encoder when the apparatus is operating in a realtime video editing mode;
a second video bus transferring data between the codec and the at least two video inputs of the graphics processor when the apparatus is operating in a realtime video editing mode. The video decoder uses one of the first and the second video buses to transfer data to the video encoder in a non-editing playback mode, and the video decoder uses one of the first and the second video buses to transfer data to the codec in a video capture mode.

Preferably, the video decoder transfers data to the codec and to the video encoder using the first video bus.

Preferably, data is transferred from the video output of the graphics processor to the codec for compression and storage in the video data storage device.

Preferably, the graphics processor has an input buffer for storing a sequence of fields of the at least two video inputs and an output buffer for storing a sequence of fields of the graphics processor video output.

Preferably, the input buffer also stores input graphic image fields.

Preferably, the graphics processor has an input buffer for storing a sequence of fields of the at least two video inputs and an output buffer for storing a sequence of fields of the graphics processor video output.

Preferably, the input buffer also stores input graphic image fields.

Preferably, the second video bus is a single bus communicating data multiplexed on the bus to all of the at least two video input.

Preferably, the apparatus further comprises an input for compressed digital video input from external device, and a decompression device, one of the at least two video inputs comprising decompressed data from the compressed digital video input.

Preferably, the compressed digital video input comprises one of an IEEE 1394 interface and an SDTI interface.

BRIEF DESCRIPTION OF THE DRAWINGS

The invention will be better understood by an examination of the following description, together with the accompanying drawings, in which.

PREFERRED EMBODIMENT

Figure 1:
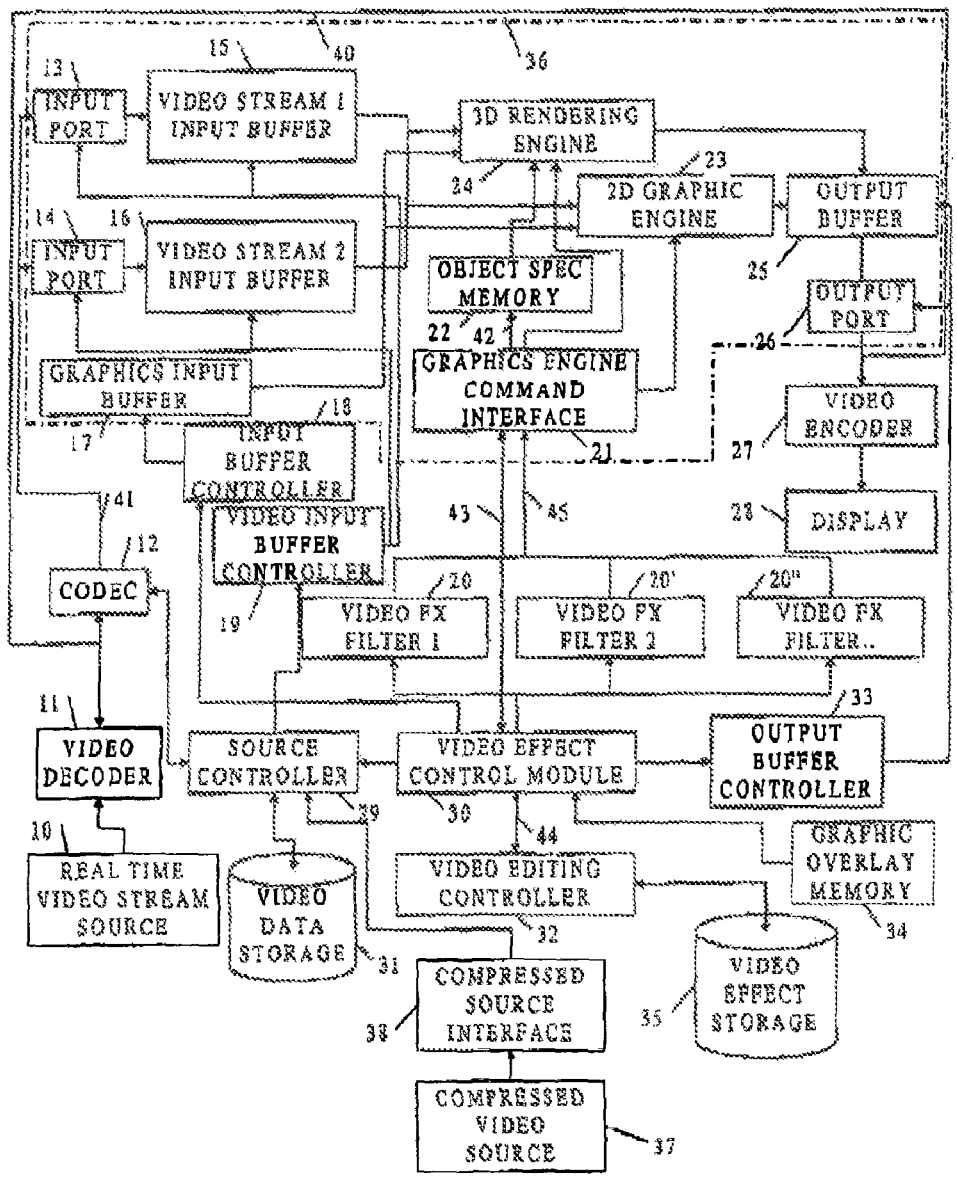
FIG. 1 presents an overview of the architecture of the invention; this invention comprises a graphics chip.

FIG. 1 is a schematic block diagram of the real-time video editing system according to the preferred embodiment which is described herein to teach the preferred mode of implementing the present invention with limiting the scope thereof as defined in the appended claims. While illustrated in the block diagram of FIG. 1 as an essemble of discrete components communicating with each other via distinct data signal connections, it will be understood by those skilled in the art that the system is provided by a combination of hardware and software components, with some components being implemented by a given function or operation of a hardware or software system, and many of the data paths illustrated being implemented by data communication within a computer application or operating system. The structure illustrated in FIG. 1 is thus provided for efficiency of teaching the present preferred embodiment.

A key feature of this invention is the use of high performance 3D graphics chips to perform a multitude of video special effects and compositing. Within the context of the system architecture of this invention, the 2D and 3D command functions found in standard high performance graphics chips can be used for video processing. These commands can be considered as a set of basic instructions. By combining these commands with the correct parameters and in the correct sequence, virtually any visual effects can be achieved in real-time.

These visual effects include all the standard classes of effects used in video production including but not limited to wipes, dissolves, keys, borders, drop shadows, trails, sparkles, 2D and 3D DVE's, surface and object morphing, explosions, multilayer compositing, anti-aliasing, spotlights and high lights, etc.

Of particular importance is the concept of using the video input buffers as source textures for 3D texture mapping. This concept allows live video streams to be mapped onto any conceivable surfaces or objects. The target surface or object can move, change orientation, transition, or morph as a function of time.

The repertoire of 2D and 3D functions used includes but is not limited to the following: color and pattern fill, bitblt and stretch blt, plane and byte write mask, block write, color keying, video or graphic overlay, look up table based RGBalpha or YUV alpha gamma correction, programmable color space conversion, video proc amp controls (brightness, contrast, hue, saturation), 3D perspective correct or non perspective correct texture mapping with bilinear, trilinear, and anisotropic filtering, textures with clamp, mirror, fixed border color, non power of 2 textures, mip mapping including real-time generation of mip maps from video surfaces, palettized textures, environment bump mapping, cubic environment mapping, Gouraud and specular lighting, multifunction alpha blending as described but not limited to the description in Microsoft DX6, 7 and 8, fog, stencil, Z and W depth buffering, stencil, edge vector based anti-aliasing, full scene anti-aliasing, fragment buffer based anti-aliasing, rendering to a texture or using the rendering engine to create a new source texture, multipass rendering to achieve compositing and other effects, hardware transform and lighting, pixel shaders and vertex shaders as described in Microsoft DX8 specification.

A real-time video stream source 10, such as a camera or a video tape recorder, is connected to a video decoder 11 whose uncompressed digital stream output signal is fed into a CODEC 12 on a first, dedicated, video bus 40. The CODEC 12 is capable of video stream compression and decompression in real-time. The CODEC 12 can also receive compressed video stream from an external device 37 such as Fire Wire (IEEE 1394) (DV Camcorder) or SDTI. In another embodiment, the architecture comprises at least two CODEC 12 in order to divide the processing time. This external device 37 is connected to a compressed source interface 38 which is connected to the source controller 29. In the preferred embodiment the compressed source interface converts incoming signals from the compressed source interface 38 into DV25 format. In another embodiment, the architecture comprises a compressed source interface 38 for each available compressed video source 37. The first video bus 40 allows the decoder 11, the CODEC 12 and the video encoder 27 to communicate an uncompressed real-time video stream. The CODEC 12 is connected to video bus 41 which allows the CODEC to output in real-time video fields of two uncompressed video streams to the input ports 13 and 14 of the video stream input buffers 15 and 16 of the graphics accelerator chip 36. In the preferred embodiment, a single bus TDMNX (with time division multiplexing to support multiple streams of video) is used. The input ports 13 and 14, and the video stream input buffers 15 and 16 are controlled by a video input buffer controller 19. The goal of the input ports 13 and 14 is to select memory locations in each video stream input buffers 15 and 16 according to the video input buffer controller 19. These memory locations will receive the video streams. In the preferred embodiment, the graphics chip 36 is preferably a Matrox G400.

The CODEC 12 is controlled by the source controller 29. In the preferred embodiment, the CODEC 12 is a C-Cube DV25/MPEG2. The source controller 29 has access to a video data storage 31. The source controller 29 also controls the video input buffer controller 19. An input buffer controller 18 controls the graphic input buffer 17 which is connected to the 3D rendering engine. The 3D rendering engine receives data streams from the video stream input buffers 15 and 16.

Although it will be appreciated that various architectures for video editing software are possible, there is illustrated in FIG. 1 a video editing controller 32 which represents the video editing user interface and controller processing associated with the application level. The video editing controller 32 may comprise, for example, the Adobe Premiere™ software package. For each specific video effect made available according to the preferred embodiment, a video effect filter module 20 is provided. An example of the video effect filter 20 is fade effect, 3D perspective effect, organic wipe effect etc. The video effect control module 30 commands the source controller 29 to retrieve specific video data files from the video data storage 31. The video effect control module 30 also commands the input buffer controller 18 and the output buffer controller 33. The output buffer controller 33 can generate an address signal which specifies a current field address. This current field address is sent to the output port 26, which will retrieve the corresponding field from the output buffer 25. The corresponding field can be then transmitted to the video encoder 27 and then to the display 28. In the preferred embodiment, the output buffer 25 has a large number of fields, the number of field is greater than 6.

The video effect control module 30 provides keyframes to the desired one of the video effect filters 20, 20', 20" etc. . . . . In response, the video effect filter 20 sends commands to the graphics engine command interface 21 of the graphics chip 36 to implement the desired video processing within the graphics chip 36. The video effect control module 30 also sends commands to the graphics engine command interface 21. The keyframe data describes the functionality of the effects and the graphics engine command interface 21 interprets the keyframe data to determine what specific graphics engine command is required. In the case of a video processing task requiring the capabilities of the 3D rendering engine 24, the graphics engine command interface 21 specifies the triangle and triangle meshes on which to map a video field with a resulting 3D perspective correct or non-perspective correct effect. Such an object is stored in memory 22 by data signal 42 and defined by the parameters for the vertices of the triangle or triangle meshes on which the video is to be mapped. Using the command data signal 45, the graphics engine command interface 21 is instructed to invoke either the 3D rendering engine 24 or the 2D graphics engine 23 to execute the desired video effect function and provide a result field for output buffer 25.

In the case of the 3D rendering engine 24, the graphics engine command interface 21 provides a specific command to the 3D engine 24 to map a selected one of the fields taken from one of the buffers 15, 16 and 17, thus obtaining a transformed field.

For the sake of the description, four video effects are herein disclosed. These effects are the fade effect, the 3D perspective effect, the organic wipe effect and the page curl effect.

The Fade Effect

The fade effect is probably the most simple graphics effect that can be performed. It consists in performing a transition between two video sources. In order to complete this video effect, two steps are needed. During the first step, the background source is copied (Blit) into the destination buffer. During the second step, a texture mapping involving the other video source and the destination buffer is performed. The texture mapping (TMAP) is performed with a blend factor chosen by the user.

Figure 2:
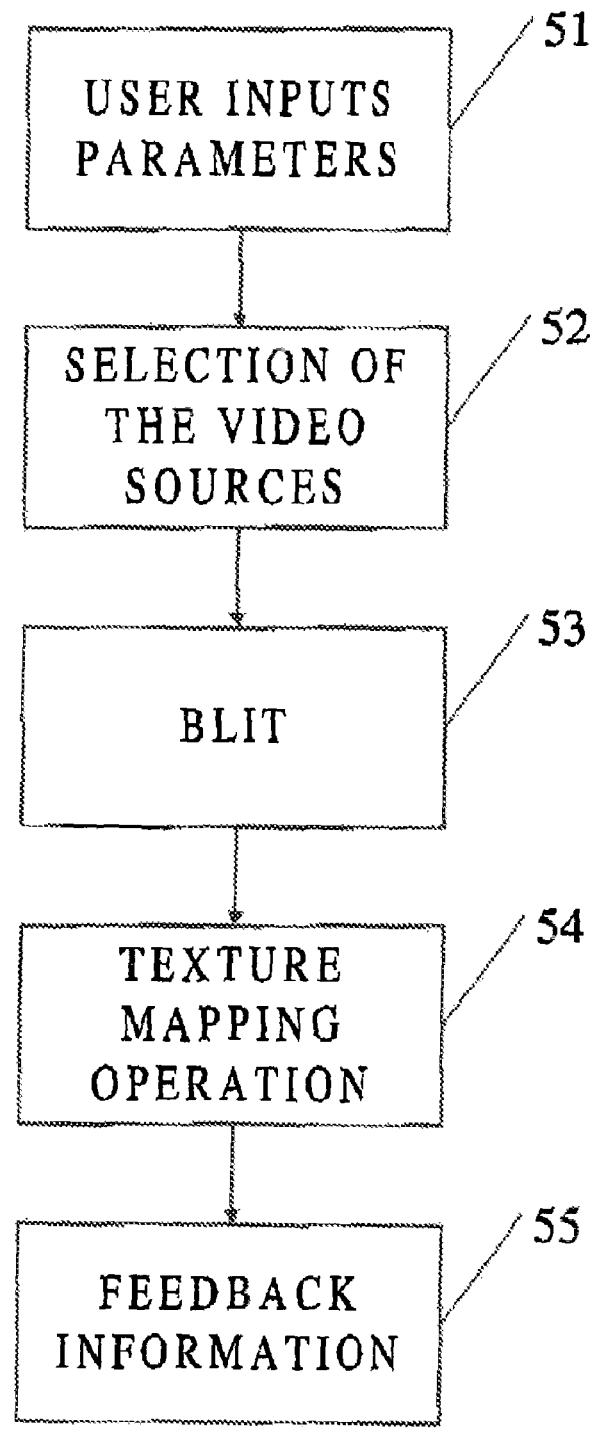
FIG. 2 shows a block diagram which describes actions to be performed to realize a fade effect using the architecture disclosed in the invention.

In the case of the preferred embodiment, the video effect is implemented within the video FX filter 20. According to FIG. 2, and in the first step 51, the user chooses using the video editing controller 32 parameters that are going to be used for the effect. These parameters comprise the fade threshold control being a blend factor. These parameters will be sent to the graphics engine 36 via the graphics engine command interface 21.

In the second step 52, the user selects the video sources to be used in the effect using the video effect control module 30. The video effect control module 30 sends the information to the source controller 29. The video input buffer controller 19 then sends addresses to the input ports 13 and 14. These addresses will correspond to the location where the video frames will be stored inside the video stream input buffer. The two video sources are either real-time video stream sources or they are provided by the video data storage 31. The codec 12 insures that the video streams are real-time video streams. These two video streams go into the video stream input buffers 15 and 16 via the input port 13 and 14. One of these video streams is read by the 2D graphics engine 23 according to the first step of the video effect.

In the third step 53, the video effect control module 30 sends command to the graphics engine command interface 21 to carry out a Blit, using the 2D engine, from one selected present video input buffer (15 or 16) into a destination buffer 25 of the graphics engine 36.

In the fourth step 54, the video effect control module sends a command to the graphics engine command interface 21, this command relates to a texture mapping operation involving the other video source and the destination buffer 25 of the graphics engine 36. The texture mapping is handled by the 3D rendering engine 24.

In the fifth step 55, a feedback command is sent by the graphics engine command interface 21 to the video effect control module 30. This feedback is performed using an interruption. A service routine is called and a system event is signalled when the interruption is generated. This feedback allows the video effect control module 30 to monitor processes.

The 3D Perspective Effect

The 3D perspective effect is more complicated than the fade effect. In one embodiment, this video effect is performed using four processing operations. The first operation consists in performing a copy (Blit) of one of the two video sources referred as the background source into the destination buffer. This action is similar to the first step of the fade effect described above.

The second operation in the 3D perspective effect is a texture mapping of the second video source with soft edges and transparency in a scratch buffer.

The third operation in the 3D perspective effect involves a Gouraud shading of the borders in the scratch buffer.

The fourth operation in the 3D perspective effect involves the generation of shadow using alpha of the modified source contained in the scratch buffer. Then the second part of this operation involves the rendering of the perspective using the scratch buffer data.

Figure 3:
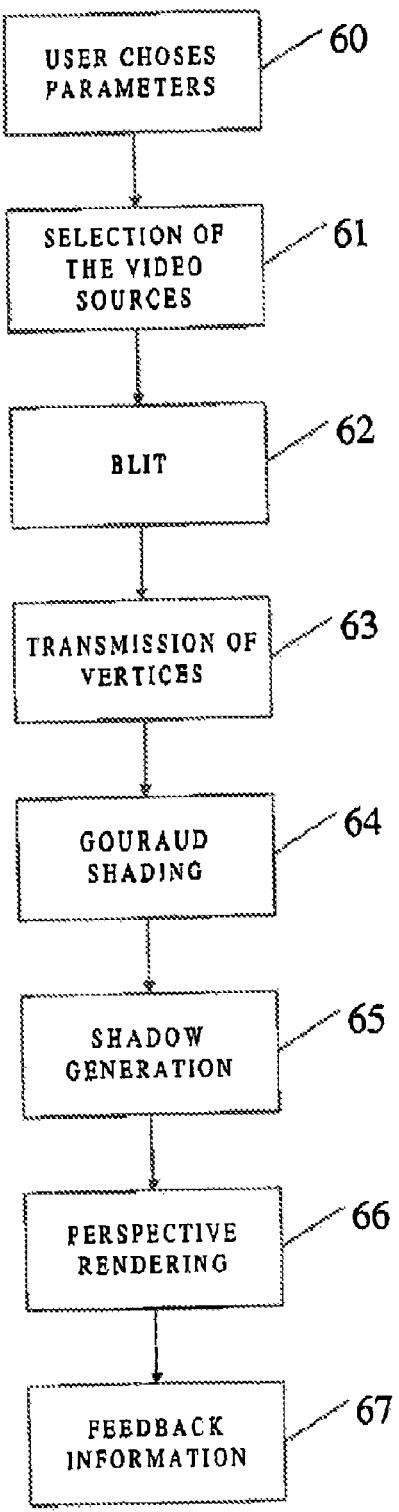
FIG. 3 shows a block diagram which describes actions to be performed to realize a 3D perspective effect using the architecture disclosed in the invention.

In the case of the preferred embodiment, the video effect is implemented within the video FX filter 20. According to FIG. 3, and in the first step 60, the user chooses, using the video editing controller 32, parameters that are going to be used for the effect. These parameters comprise the transparency control, soft edges characteristics, Gouraud parameters, the 3D world transformation matrix, the drop shadow parameters (drop shadow color, drop shadow position).

In the second step 61, the user selects the video sources to be used in the effect using the video effect control module 30. The video effect control module 30 sends the information to the source controller 29. The two video sources are either real-time video stream sources or they are provided by the video data storage 31. The codec 12 feeds real-time video streams. These two video streams go into the video stream input buffers 15 and 16 via the input port 13 and 14.

In the third step 62, the video effect control module 30 sends command to the graphics engine command interface 21 to carry out a Blit, using the 2D graphics engine 23, from one selected present video input buffer (15 or 16) into a destination buffer 25 of the graphics engine 36.

In the fourth step 63, the video effect control module 30 sends vertices to the graphics engine command interface 21. These vertices will be sent to the 3D rendering engine 24 via the object specification memory 22. These vertices are used at this step to perform a texture mapping of one selected video source. This texture mapping is done with soft edges and transparency according to the parameters chosen by the user via the video editing controller 32. This texture mapping is performed by the 3D rendering engine 24. The result is stored into a scratch buffer, located within the graphics engine 36.

In the fifth step 64, the graphics chip applies Gouraud shading to the scratch buffer. This Gouraud shading is performed by the 3D rendering engine 23 according to parameters received by the graphics engine command interface 21.

In the sixth step 65, generation of shadow using the alpha of the scratch buffer is performed. This is performed according to informations received by the graphics engine command interface 21 and transmitted to the 3D graphics engine 24 which will perform the task.

In the seventh step 66, the rendering of the perspective is done using the scratch buffer and the destination buffer 25. This is performed using the 3D rendering engine 24 and according to commands issued by the graphics engine command interface 21.

In the eighth step 67, a feedback command, similar to the feedback command described in the fade effect, is sent by the graphics engine command interface 21 to the video effect control module 30. This feedback allows the video effect control module 30 to monitor processes.

The Organic Wipe Effect

The organic wipe effect is performed, in one embodiment, using three different operations. The first operation consists of copying the background source into the destination buffer. The second operation consists of passing a defined grey scale pattern into a palette expansion unit. The third operation consists in doing a texture mapping between two video sources and modulating this texture mapping using the palette expanded grey scale pattern image.

Figure 4:
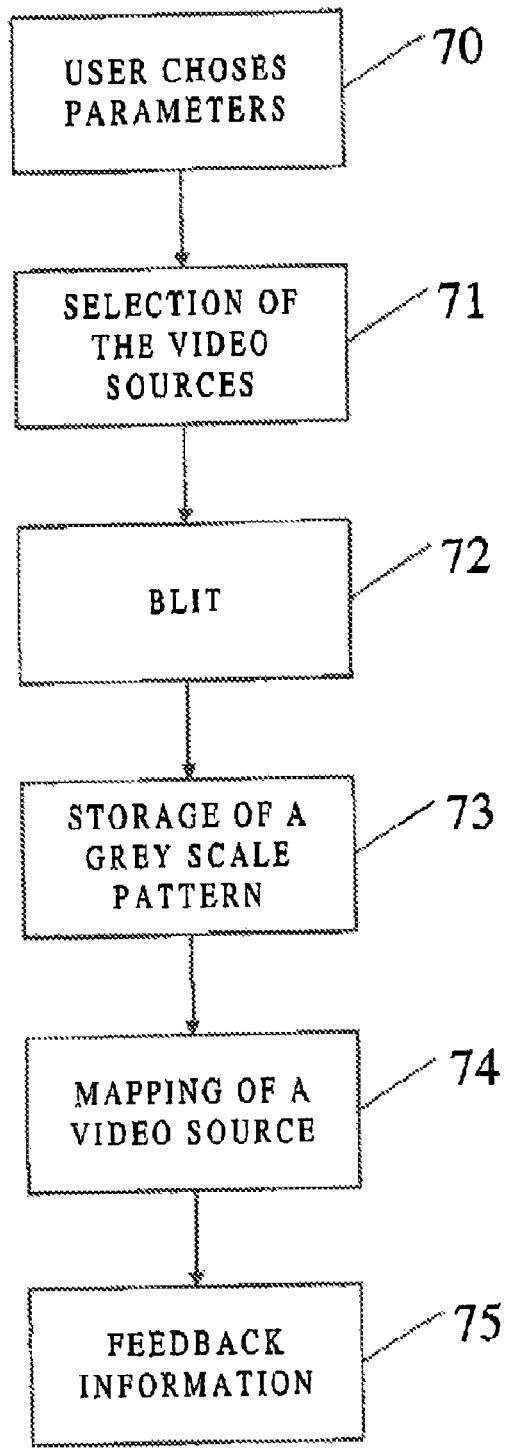
FIG. 4 shows a block diagram which describes actions to be performed to realize an organic wipe effect using the architecture disclosed in the invention.

In the case of the preferred embodiment, the video effect is implemented within the video FX filter 20. According to FIG. 4, and in the first step 70, the user chooses, using the video editing controller 32, parameters that are going to be used for the effect. These parameters comprise soft edges characteristics, a blend factor for the texture mapping, and a defined grey scale shape.

In the second step 71, the user selects the video sources to be used in the effect using the video effect control module 30. The video effect control module 30 sends the information to the source controller 29. The two video sources are either real-time video stream sources or they are provided by the video data storage 31. The codec 12 insures that the video streams are real-time video streams. These two video streams go into the video stream input buffers 15 and 16 via the input port 13 and 14.

In the third step 72, the video effect control module 30 sends command to the graphics engine command interface 21 to carry out a Blit using the 2D graphics engine 23 from one selected present video input buffer (15 or 16) into a destination buffer 25 of the graphics engine 36.

In the fourth step 73, the grey scale pattern which is stored inside the graphics engine 36 is partly sent, according to a softness threshold, to another location inside the graphics engine 36. The graphics engine command interface 21 sends this order to the 3D rendering engine 24 according to the video effect control module 30.

In the fifth step 74, the other video source located in either the video stream input buffer 15 or 16 is mapped with the data contained in the destination buffer 25 of the graphics engine 36 using the alpha expanded grey scale pattern to control the alpha blending or keying ratio. This task is completed by the 3D rendering engine 24 upon request of the graphics engine command interface 21.

In the sixth step 75, a feedback command, similar to the feedback command described in the fade effect, is sent by the graphics engine command interface 21 to the video effect control module 30. This feedback allows the video effect control module 30 to monitor processes.

The Page Curl Effect

To achieve a page curl effect, a number of video and graphics processing steps are required before the final video field can be output to buffer 25. The page curl effect is, as the previous effects described above, one example of an unlimited variety of effects that can be achieved with this invention. More precisely, to achieve a page curl, the video effect filter 20 will determine, based on the keyframe data, the exact object data for the particular state of the page curl and output this to the object specification memory 22. The object specification memory contains as series of 2D and 3D graphics commands with necessary parameters to construct the desired effect.

The page curl surface is broken up into a triangle mesh. The triangle mesh provides a means of texture mapping the video input source texture buffer onto the curved surface. This triangle mesh is broken up into a series of perspective correct triangle texture mapping commands to the 3D graphics engine 24. To improve the appearance of the page curl, the graphics hardware may be commanded to create mip maps of the video input surface 1 and 2. These mip map surfaces may be used with trilinear or anisotropic filtering on each video texture mapped triangle by 3D rendering engine 24. The rendering engine renders the texture mapped triangles into output buffer 25. In addition, Gouraud or specular lighting may be applied to achieve the effect of a specular highlight. Anti-aliasing may be applied to the edges of the page curl to remove jagged edges. Since the curled page reveals an underlying image (even if it is simply a background blank), it is preferred to blend the image of the curled page with a second field for the underlying image.

In the case that graphics titles are to be overlaid during the video editing, the video effect control module 30 takes the selected graphics from a graphics overlay memory 34 and outputs the field images, in RGB or other desired format, to the graphics input buffer 17 via the input buffer controller 18 and the video effect filter 20 commands via the graphics engine command interface 21 either the 3D rendering engine or the 2D graphics engine to overlay or blend or render the desired image using the graphics field.

It is important to notice that data coming from the graphic input buffer 17 are handled like data coming from the video stream input buffers 15 and 16, meaning that it is possible to achieve video effects with video frames coming from the graphic input buffer 17.

The graphics engine command interface 21 provides feedback that a specific graphics engine command has been successfully executed using a return command path 43. In the preferred embodiment, this feedback command is issued when a video field is entirely rendered. For instance, this can be done after two video effects if two video effects are applied to a single field. In the effects described above (fade effect, 3D perspective effect and organic wipe effect), and only for the purpose of the description, each field is handled by only one effect. The graphics engine command interface 21 processes instructions in a stack. Data signal 43 is used by the video effect control module 30 to confirm that the processing is being carried out in real-time, this is done by counting free fields in the output buffer 25. If the video effect control module 30 detects that the graphics chip 36 has not been able to complete quickly enough the requested video image processing, and that the output buffer 25 may be depleted, the video effect control module 30 may change, in one embodiment, the nature of the keyframe data either to specify that simpler video effects are to be performed or that a given frame or number of frames should be skipped in order to ensure that the remainder of the video editing takes place in real-time without the video output buffer 25 being depleted. In another embodiment, the video effect control module 30 may also inform the video editing controller 32 that the graphics chip 36 has not been able to complete quickly enough the requested video image processing, and that the output buffer 25 may be depleted. According to user preferences, the video editing controller 32 may inform the user with a pop up message.

What is claimed is:

1. A method of editing a plurality of video streams with a graphics accelerator chip that includes a 2D and 3D graphics engine, the method comprising acts of:

providing a first digital video stream to a graphics accelerator chip;

providing a second digital video stream to the graphics accelerator chip;

performing video editing on the first digital video stream and the second digital video stream using the 2D and 3D graphics engine; and outputting an edited digital video stream from the graphics accelerator chip, wherein said edited digital video stream includes edited video from at least one of the first digital video stream and the second digital video stream.

2. The method of claim 1, further comprising an act of receiving a video effect.

3. The method of claim 2, further comprising an act of providing a series of commands to the graphics accelerator chip to perform the received video effect on the first digital video stream and the second digital video stream using the 2D and 3D graphics engine.

4. The method of claim 3, wherein each one of the series of commands defines a graphics processing step.

5. The method of claim 1, wherein the first digital video stream includes a first real-time digital video stream and the second digital video stream includes a second real-time digital video stream.

6. The method of claim 1, wherein the first digital video stream includes a first uncompressed real-time digital video stream and the second digital video stream includes a second uncompressed real-time video stream.

7. The method of claim 1, wherein each of the first digital video stream and the second digital video stream originates from a video data storage medium.

8. The method of claim 1, wherein the edited digital video stream includes an edited uncompressed real-time digital video stream.

* * * * *